Patented June 20, 1939

2,162,729

UNITED STATES PATENT OFFICE 2,162,729

METHOD OF PREPARING FEED MATERIAL

Arthur A. Levinson, Chicago, and James L. Dickinson, Itasca, Ill., assignors to The Glidden Company, Cleveland, Ohio, a corporation of Ohio No Drawing. Application June 8, 1938, Serial No. 212,608

9 Claims. (Cl. 99—2)

The present invention relates to the production of feed material from proteinaceous, oleaginous seeds such as soy beans, peanuts, etc. More particularly the invention relates to the treatment of the solvent extracted seed material to render it edible and palatable.

One of the customary ways of recovering the oil from such seed materials as soy beans is by solvent extraction. The beans are usually ground or flaked and the oil then removed by some suitable solvent. The solvent remaining in the flakes or meal is then removed by evaporation. The solvent free material may then be used in various ways. It can be ground up into a flour, or it may be used for some adhesive purpose, either as such or upon further treatment.

It would be very desirable if the extracted meal or flakes could be sold and used for stock feeding purposes. However, there has been considerable sales resistance to such material, and it is not the most satisfactory feed. There is a considerable amount of dust, the removal of which is a costly procedure. Also in meal of this type the hulls have a tendency to separate from and break away from the meal or flake, giving an appearance of a much larger percentage of hulls than actually is present. Another serious deterrent to the use of the extracted material is that it has a beany bitter flavor which has been almost impossible to remove, and which makes the meal or flakes extremely unpalatable.

To overcome the above mentioned disadvantages has been a problem to the manufacturer of extracted soy bean products. After thorough investigation we have developed a process whereby the extracted meal or flakes can be made into a feed product which has none of the above mentioned disadvantages and which is entirely suitable as a stock feed. By our process the flakes are completely disembittered and lose their beany taste. There is no dusting or separation of hulls.

We have found that by subjecting extracted meal or flakes, containing the proper moisture content, to heat and pressure that an excellent feed product can be produced. The heat and pressure act to form steam in the moisture containing extracted material which disembitters it and removes the beany flavor. The heat and pressure also compacts the material so that dusting and segregation of hulls is prevented. The heat and pressure used are such that the material being treated is given a slightly toasted action without any scorching, the steam generated during the process being an important factor in preventing the scorching of the material. Likewise the heat and pressure has a plasticizing action on the material.

An important feature of the present invention is the control of the moisture content of the meal subjected to heat and pressure. The amount of moisture should be such that the steam generated will drive off the bitter principles of the meal, but at the same time should not be so high as to cause uneven toasting of the meal. If the moisture content is too high the portions of the meal away from the source of heat will not be toasted, or if sufficient heat and pressure are applied to toast the portions away from the source of heat, those portions in juxtaposition to the source of heat will be scorched or burned.

Another important phase of the present invention is the use of relatively high pressures. This results in a compacting and plasticizing of the meal whereby a cake is formed in which the dust and hulls are uniformly combined with the use of the meal. The plasticizing action during the pressure and heat treatment causes the cake to be substantially uniform, in which the fines and hulls are intimately held. Also the use of pressure results in a material reduction of time to effect the necessary toasting and disembittering of the meal.

The temperatures used are such that the moisture in the meal is converted into steam, and the meal is given a uniform toasting without scorching or burning. If the temperatures are too low the proper amount of toasting is not obtained and likewise no plasticizing action will occur. Too high temperatures result in uneven toasting and "case hardening" of the cake produced.

It has been found that the moisture content of the meal to be subjected to heat and pressure may preferably vary between about 4.5 and 7%. If the temperature is much lower insufficient disembittering is obtained and if much higher uniform toasting is not obtained. As the meal ordinarily contains about 10% moisture, the excess is removed before subjecting the meal to temperature and pressure. This moisture is preferably removed by heating at a temperature insufficient to cause toasting of the meal but sufficiently high to cause the formation of steam in the flakes. This aids in the disembittering and when used in conjunction with the subsequent pressure treatment results in an excellent product. This preheating also results in increased capacity of the press due to reduction in the time necessary to heat the meal up to the proper temperature in the press.

The pressures used may be varied but will ordinarily be between #2000 and #5000 pressure per square inch. The advantage of such pressures is to compact and plasticize the material. In addition it has been found that such pressures greatly reduce the time in which the toasting and disembittering take place. United States Patent No. 1,194,495 indicates that at pressures of 14 atmospheres that about seventy minutes to an hour and a half at 120° to 300° C. are required to toast and disembitter soya bean flour. It has been found that when the pressures indicated are used and the temperature is within the range of 150° to 200° C. the meal is toasted and disembittered in from one and a half to five minutes.

Another important feature of the invention is the control possible of the fat content in the finished product. Ordinary expeller meal contains from 4.5 to 6.5 percent oil depending upon a number of conditions over which the processor has little or no control, such as size of beans, their dryness, etc. Likewise, it is not practical to control the amount of oil in the extracted flakes as it has been found that the more oil remaining in the flakes the more difficult is the removal of the solvent employed for the extraction. Consequently all the oil possible is removed, the amount of oil ordinarily remaining in the extracted flakes being less than one percent.

Accordingly, it is possible by the present invention to standardize the fat content of the finished product. If desired, soy bean oil can be added to the meal before entering the expeller. Any number of oils, however, may be added, such as cod-liver oil, linseed oil, or any oil having good food value. It should be understood, however, that oils need not necessarily be added, as for some purposes an extremely low fat content may be desirable. In any event it is possible by the present process to accurately control the fat content of the meal cake.

It has been found that the desired conditions for producing the desired results can be obtained by the use of a screw press of the type disclosed in United States Patent No. 731,737, and customarily referred to in the art as an "Anderson expeller". It has been found that the proper degree of toasting is obtained when the press is so set that the thickness of the cake is about half that when the press is used for expelling oil from the oil containing beans. The pressures necessary to expel the oil generate such high temperatures due to friction that the cake is scorched. By using lower pressures, such high temperatures are not produced and the cake is properly toasted and disembittered. These expellers are customarily equipped with tempering chambers and these provide convenient means for conditioning the flakes or meal for treatment in the press proper. Thus where the moisture content is too high the meal can be preheated and dried to the proper moisture content in these tempering chambers.

The following example is illustrative of conditions producing a satisfactory material from extracted flakes in which an "Anderson expeller" is employed:

| | |
|---|---|
| Moisture in flakes_____percent__ | 9.1 |
| Moisture in flakes after tempering percent__ | 5.4 |
| Temperature of flakes after tempering_____° C__ | 95 |
| Temperature in press_____° C__ | 150–200 |
| Pressure in press_____lbs./sq. in__ | 2000–3000 |
| Time of material in press__minutes__ | 3 |
| Thickness of cake_____inches__ | ¼ to ⅜ |

The pressure was such that the moisture was converted into steam and the cake was slightly toasted without scorching and had a nutty flavor free from bitterness or beany flavor. The product was less bitter than ordinary expeller cake since in the latter case the moisture content of the beans so treated is so low that effective disembittering by steaming is not obtained. The cake resulting from the process is also free from dusting and there is no segregation of the hulls. It can be used as is for range feeding, or can be ground for use in ground and/or mixed feeds.

In another example, the extracted meal was treated in a plate press having heated plates. The material was first placed in the press and allowed to stand in order to preheat the material. The following conditions were observed:

| | |
|---|---|
| Temperature of upper plate_____° C__ | 174 |
| Temperature of lower plate_____° C__ | 166 |
| Pressure_____lbs./sq. in__ | 2500 |
| Time pressure applied_____minutes__ | 3 |
| Moisture in meal_____percent__ | 5.4 |

The resulting cake was of a uniform color, slightly toasted without being scorched, and had a nutty flavor free from bitterness or beany taste.

Thus by the method described, there is produced a feed material free from disagreeable taste and in a form readily useable for feed, without the objectionable features found when the extracted meal is used as a feed. It will be apparent to those skilled in the art that various changes and modifications may be made from the procedures given without departing from the spirit and scope of the invention.

We claim:

1. The process of preparing a feed material which comprises subjecting solvent extracted soy bean meal containing from 4.5 to 7% moisture to a pressure between 2,000 and 5,000 pounds per square inch for a time and at a temperature sufficient to convert the moisture into steam whereby the meal is disembittered, and to toast the meal without scorching.

2. The process of preparing a feed material which comprises subjecting solvent extracted soy bean meal containing from 4.5 to 7% moisture to a pressure between 2,000 and 5,000 pounds per square inch and at a temperature between 150° and 200° C. for a time sufficient to toast the meal without scorching.

3. The process of preparing a feed material which comprises subjecting solvent extracted soy bean meal containing from 4.5 to 7% moisture to pressure between 2,000 and 5,000 pounds per square inch, at a temperature between 150° to 200° C. for a time between one and a half and five minutes.

4. The process of preparing a feed material which comprises subjecting solvent extracted soy bean meal containing approximately 5.4% moisture to a pressure between 2,000 and 3,000 pounds per square inch at a temperature between 150° C. and 200° C. for approximately three minutes.

5. The process of preparing feed material from solvent extracted soy bean meal which comprises the combination of adjusting the moisture content of the meal to between 4.5 and 7% and subjecting the so treated meal to pressures of 2,000 to 5,000 pounds per square inch to elevated temperatures of a degree and for a time sufficient to convert the moisture into steam, and to toast the meal without scorching.

6. The process of preparing feed material from solvent extracted soy bean meal which comprises the combination of preheating the meal to convert excess moisture into steam until the moisture content is between 4.5 and 7% and subjecting the preheated meal to pressures of 2,000 to 5,000 pounds per square inch to elevated temperatures for a time and of a degree sufficient to convert the moisture into steam, and to toast the meal without scorching.

7. The process of claim 6 in which the temperature is between 150° C. and 200° C.

8. The process of claim 6 in which the temperature is between 150° C. and 200° C. and the time is between one and a half and five minutes.

9. The process of claim 6 in which the moisture content of the meal after the preheating step is approximately 5.4%.

ARTHUR A. LEVINSON.
JAMES L. DICKINSON.